United States Patent [19]
Jelinek et al.

[11] Patent Number: 5,149,109
[45] Date of Patent: Sep. 22, 1992

[54] INTERLOCKING SEGMENTED SEAL

[75] Inventors: Jerry G. Jelinek, LaHabra; Orville J. Bain, Van Nuys, both of Calif.

[73] Assignee: Parker-Hannifin Corporation, Cleveland, Ohio

[21] Appl. No.: 761,591

[22] Filed: Sep. 18, 1991

[51] Int. Cl.⁵ .................................. F16J 9/16
[52] U.S. Cl. .................. 277/199; 277/192; 277/221; 277/222; 403/381
[58] Field of Search .............. 277/192, 199, 220, 221, 277/222, 235 B; 403/334, 340, 381

[56] References Cited

U.S. PATENT DOCUMENTS

| | | | |
|---|---|---|---|
| 1,986,465 | 1/1935 | Dempsey | 277/199 |
| 3,175,832 | 3/1965 | Carrell | 277/222 |
| 3,231,289 | 1/1966 | Carrell | 277/222 |
| 4,019,298 | 4/1977 | Johnson, IV | 403/381 |
| 4,186,930 | 2/1980 | Shulke | 277/199 |

FOREIGN PATENT DOCUMENTS

| | | | |
|---|---|---|---|
| 0356639 | 10/1961 | Switzerland | 403/381 |
| 2115099 | 9/1983 | United Kingdom | 403/381 |

Primary Examiner—William A. Cuchlinski, Jr.
Assistant Examiner—Daniel G. DePumpo
Attorney, Agent, or Firm—Ralph E. Jocke

[57] ABSTRACT

A segmented seal (10) for sealing a first area bounded by the seal from an exterior area, is assembled from segments (12). Each segment includes a metal retainer plate (18) with resilient elements (20) (22) molded thereon. First ends (14) of the segments include tongue portions (34) which are accepted in groove portions (36) on second ends (16) of adjacent segments. Abutting surfaces of the resilient elements, and the tongue portions and groove portions, are tapered to extend at a parallel, acute angle to facilitate assembly. The tapered mating surfaces enable adjacent surfaces of the seal to be readily brought into initial contact. A solid abutting fit between adjacent segments and resilient elements is formed as the segments are aligned and secured. The construction is particularly useful in outer space environments where the seal may be readily assembled for use in connecting adjacent modules of a space craft, or disassembled.

7 Claims, 5 Drawing Sheets

INTERLOCKING SEGMENTED SEAL

TECHNICAL FIELD

This invention relates to large segmented seals. Particularly this invention relates to large seals used to seal an interface between two detachable modules of a space craft which encloses an atmosphere to support life forms in outer space.

BACKGROUND ART

Seals are used in various applications to prevent the escape of fluid between adjacent surfaces. Many seals are of one piece construction.

When the surfaces to be sealed are very large, it is sometimes impractical to make the seal as a single piece. In other cases the surfaces to be sealed are on separable parts which must be assembled with the seal in place. In such cases a split or segmented seal has been used to seal between the surfaces.

It is sometimes necessary to attach one man made body to another man made body in outer space. When human beings, or other life forms that require an atmosphere to live, are to be housed in the assembled bodies, a seal must be provided in the area where the bodies ar joined together. The seal holds the gases which make up the atmosphere inside the bodies and prevents their escape into outer space.

Usually the seals at the interface between the bodies or modules are in the shape of large rings. A seal typically includes a metal retainer ring with one or more resilient portions extending concentrically about the metal retainer ring.

The resilient portions of the seal abut the adjacent bodies on each side of the seal. The seal is held in place between flange portions on the bodies. When the seal is compressed between the flange portions, the escape of gases from the area beyond the seal is minimized.

The seals between modules of a space craft often must have very large diameters to provide access for people and equipment. Because of size, it is usually impractical to make the seal and retainers as a single piece. In the past, seals have been made in sections. U.S. Pat. No. 3,175,832 discloses an example of a seal made in sections. However, when seals intended for outer space applications are made in sections, certain problems must be overcome.

When a large seal is made in sections, the elastomeric sealing portions of the seal, as well as the retainer, are made in segments. In the past, the resilient portions have been made to extend slightly beyond the edges of the retainer segments prior to assembly of the seal. When the segments are assembled, the resilient portions must be compressed in the areas where they abut one another. Such compression is desirable to minimize leakage. Also when the seal is formed in sections, the holes in the retainer which accept dowels and fasteners used to position and hold the seal, must be positioned precisely to insure that the segments fit together properly.

Problems may arise when a seal suitable for use in outer space applications is made in segments. If the edges of the retainer are not made precisely to provide a tight fit, the effectiveness of the seal joint may be impaired. The resilient sealing portions also have a tendency to curl at the interface between the segments rather than compress one another purely in the tangential direction. Such deformation may also have an adverse impact on seal effectiveness. Of course the necessity of achieving a precise fit requires holding close tolerances which adds difficulty to the manufacture of the seal assembly. Segmented seal assemblies of the type known in the prior art can also be very difficult to assemble particularly in an outer space environment where astronauts have difficulty forcing slight interference fits together or in earth environments where robotic equipment is used to assemble the seal segments.

Thus there exists a need for an interlocking segmented seal that is reliable, less difficult to manufacture and which can be assembled more easily, particularly in outer space environments.

DISCLOSURE OF INVENTION

It is an object of the present invention to provide an interlocking segmented seal that can be assembled and used between modules which house an atmosphere to sustains life forms in outer space environments.

It is a further object of the present invention to provide an interlocking segmented seal that can be made in segments and which can be readily assembled and disassembled.

It is a further object of the present invention to provide an interlocking segmented seal that can be assembled more readily and with less risk of malfunction.

It is a further object of the present invention to provide an interlocking segmented seal that minimizes the loss of gases from an area extending through the interior of the seal.

It is a further object of the present invention to provide an interlocking segmented seal that can be manufactured more readily.

Further objects of the present invention will be made apparent in the following Best Modes for Carrying Out Invention and the appended claims.

The foregoing objects are accomplished in the preferred embodiment of the invention by a large ring seal used for isolating a first pressurized area from an exterior area. The first area includes an open area bounded by the seal and between two adjacent separable bodies which comprise a portion of a space vehicle. Like prior art seals, the present invention is made in arcuate segments which fit together to form a ring seal.

Each arcuate segment is comprised of a retainer plate made of metal material. Each plate has a first face adjacent the first body or module and a second face opposed of the first face and adjacent the second module. Each plate has a first edge and a second edge. The first edge includes a "tongue" and the second edge includes a "groove". The tongue portion is accepted into the groove portion of the adjacent seal plate in close, interfitting relation.

Each retainer ring segment plate incorporates resilient elements. The elements extend about the plate and protrude therefrom on the first and second faces. When the seal ring is assembled, the resilient elements form concentric circles extending about the ring seal. In the preferred form of the invention, two similar resilient element portions extend outward beyond each face of the retainer, but in other embodiments different numbers of resilient elements and extending portions may be used.

When the seal ring is assembled, it is positioned between flanges on the first and second modules. By securing and tightening the seal between the flanges, the resilient elements are compressed and seal against the loss of gases from the area which is bounded by the seal.

In the preferred form of the present invention, a mating 2°-7° taper from an axis normal to the seal is provided on the edges of the retainer plates and on the resilient portions in the areas where they contact one another at the interfaces between the segments. Each abutting surface is tapered so that its surface extends parallel to the abutting surface.

When the segments comprising the seal incorporating the invention are initially brought together for assembly, there is clearance between abutting surfaces due to the taper. As the segments are aligned and fastened in place, the tapered surfaces of the retainer plates come together to provide metal-to-metal contact. The resilient elements, which extend beyond the edges of the segments in the uncompressed condition, compress one another in the tangential direction as adjacent portions of the ring are fixed. The taper which is provided on the surfaces of the abutting resilient portions, minimizes curling of the abutting edges and forms continuous bands about the seal.

BEST MODE FOR CARRYING OUT INVENTION

Figure 1:
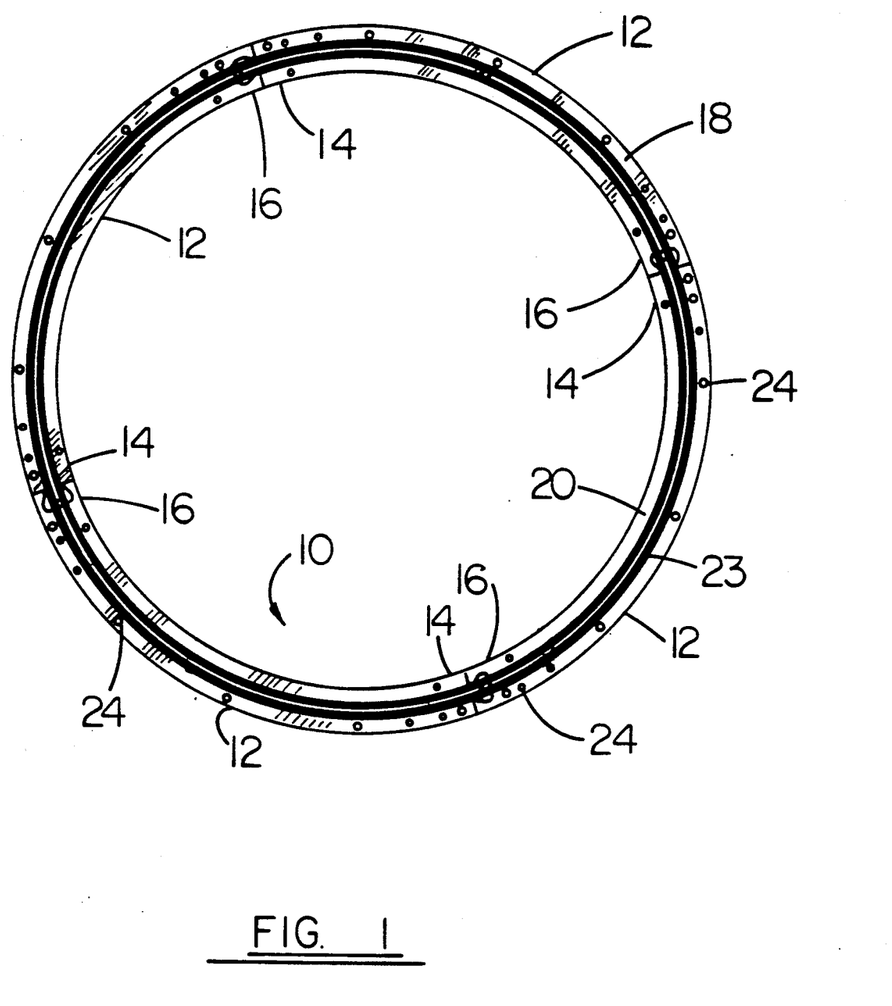
FIG. 1 is a plan view of the preferred embodiment of the seal of the present invention.

Referring now to the drawings and particularly to FIG. 1 there is shown therein the preferred embodiment of the seal of the present invention, generally indicated 10. The seal is comprised of four interlocking arcuate segments 12, each of which segments is identical. Each segment 12 has a first end 14 and a second end 16. The first end of each seal segment abuts and interfits within a second end of the adjoining segment.

Each seal segment includes a retainer plate 18. Retainer plate 18 has thereon an inner resilient element 20 and an outer resilient element 22. Retainer plate 18 is made of metal or other rigid material and the resilient elements are comprised of a elastomeric material molded thereto. A plurality of access holes 24 extend through retainer plate 18 in various areas about its circumference. Access holes 24 are sized for accepting dowl pins and fasteners. The dowl pins and fasteners are used to position and hold the seal in place between flanges on adjacent bodies comprising a space craft connected through the seal.

Figure 3:
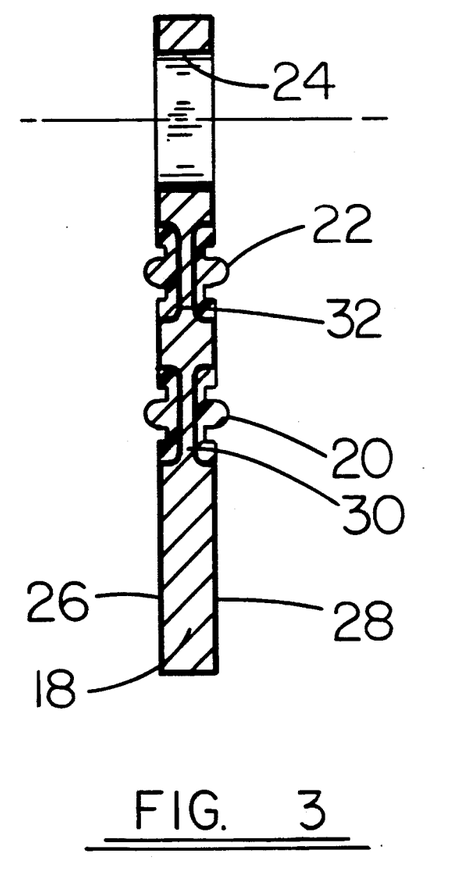
FIG. 3 is a cross-sectional view of the seal taken along line A—A in FIG. 1.

As shown in FIG. 3, retainer plate 18 has a first face 26 which, when the seal is mounted, is adjacent a first body. Retainer plate 18 also has a second opposed face 28 which is positioned adjacent a second body. A resilient element 20 is molded to the retainer and includes a portion which extends outward from both the first and second faces of the retainer as shown. Along the length of the arcuate retainer segment away from the ends, webs 30 extend through element 20 to hold it in place on the retainer. Similarly, outer resilient element 22 has portions which extend outward from both retainer faces. Webs 32, similar to webs 30, extend through element 22 to hold it in position on the retainer.

In the preferred form of the invention, the resilient elements are made from a fluorocarbon compound V720-75 available from Parker Hannifin Corporation. I other embodiments other resilient materials may be used.

Figure 2:
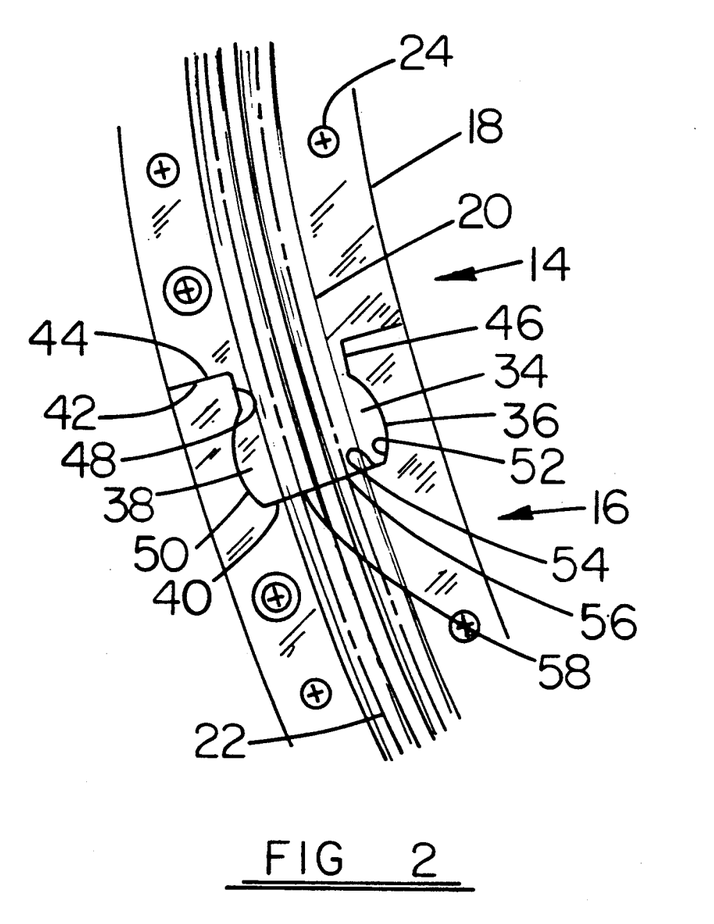
FIG. 2 is an enlarged view of area "B" of the seal shown in FIG. 1.

As shown in FIG. 2, each first end 14 of the segments 12 includes tongue means 34. Tongue means 34 is sized to fit into groove means 36 at the second end of each segment. Each tongue means 34 includes a cylindrical portion 38. The cylindrical portion terminates in a blunt end 40.

First edge surfaces 42 at the first end 14 of each segment, extend in a radial direction with respect to the circular seal. First edge surfaces 42 abut a second edge surface 44 at the second end of an adjacent segment (see FIG. 5). A pair of neck walls 46 extend circumferentially outward from the first edge surfaces 42 to cylindrical portion 38. Boundary walls 48 o the second end of each segment abut the neck walls 46.

The cylindrical portion 38 of tongue means 34 is bounded in a direction normal to the seal by first wall surfaces 50. Wall surfaces 50 are arcuate surfaces that extend from neck walls 46 to blunt end 40. Second wall surfaces 52 on the second end of the seal segments are positioned in close fitting relation with first wall surfaces 50. The groove means 36 also includes a front wall 54 which abuts blunt end 40 of the adjacent tongue means. The adjacent surfaces of the tongue means and groove means are all made to be in abutting relation when the segments are assembled to form the seal to insure that there are no breaks in the continuity of the retainer.

Figure 4:
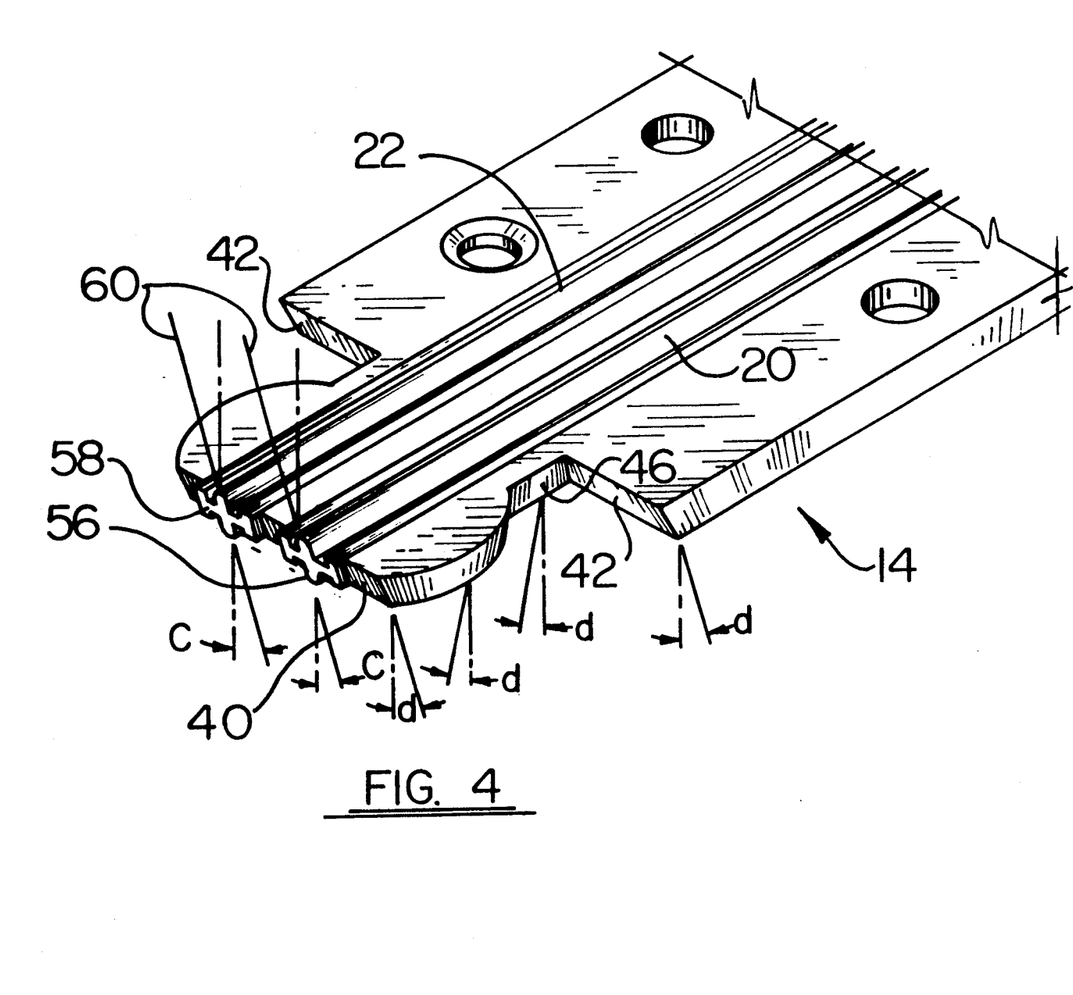
FIG. 4 is a perspective view of a first end of a seal segment.

The first end 14 of a seal segment 12 is shown in FIG. 4 prior to assembly of the seal. In an uncompressed condition, resilient elements 22 extend slightly beyond blunt end 40. The resilient elements terminate in slightly tapered first surfaces 56, 58. Surfaces 56, 58 are tapered at an acute angle C to an axis 60 which extends perpendicular to the plane of the seal. In the preferred form of the invention, angle C is from 2° to 7°.

Figure 5:
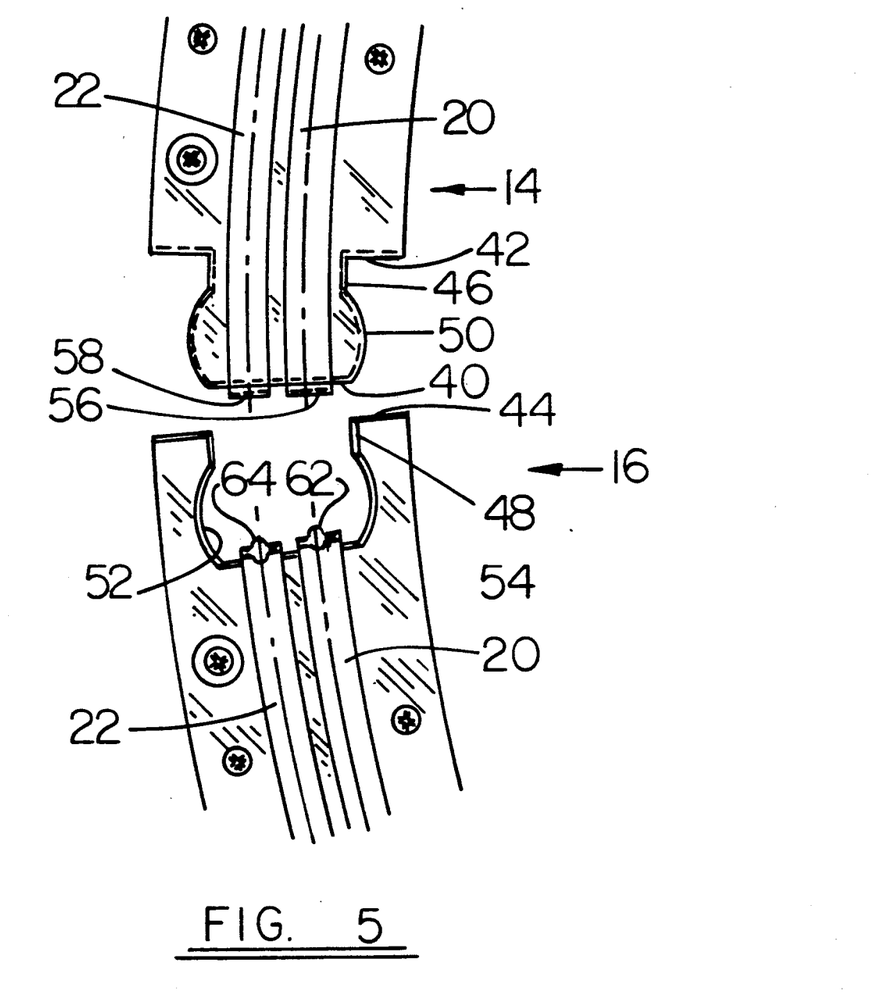
FIG. 5 is a plan view of interfitting first and second ends of adjacent seal segments.

As shown in FIG. 5, at the second end 16 of each segment 12, the resilient elements in the uncompressed condition extend slightly beyond the front wall 54. At the second end, resilient elements 20 and 22 terminate in second tapered element surfaces 62, 64 respectively. Second tapered element surfaces 62, 64 are tapered at a similar acute angle to surfaces 56 and 58 and extend parallel thereto.

First edge surfaces 42 are also tapered at an angle designated D in FIG. 4. Second edge surfaces 44 are tapered at a similar angle. In the preferred form of the invention, angle D is the same as angle C, that is from 2° to 7°. Blunt end 40 and adjacent front wall 54 are similarly tapered and extend parallel to one another.

The neck walls 46 are also slightly tapered as shown in FIGS. 4 and 5 as are boundary walls 48. In the preferred embodiment, walls 46 and 48 are also slightly tapered at the same angle as the other walls. Likewise, first wall surface 50 of the tongue means and second wall surface 52 of the groove means are tapered at a similar angle.

The tapered, mating surfaces of the resilient seals 56, 58, 62 and 64 the mating tapered edge surfaces 42 and 44 and the walls bounding the tongue means 34 and the groove means 36, provide a seal construction that has improved sealing integrity and ease of assembly. As best seen in FIG. 5, when first end 14 is brought adjacent to a second end 16 of a segment, there is initially a clearance between the abutting walls of the tongue means and groove means. This is because of the slight taper which provides clearance between adjacent parts. When the seal segments are brought into alignment as the result of tightening the fasteners which fix the seal in position, the tapered surfaces move into tight abutting relation.

The mating tapered surfaces of the resilient elements are particularly advantageous. This feature enables the resilient elements to compress each other in the tangential direction to achieve a good seal across the interface between adjoining segments. This is achieved because the mating tapered surfaces 56, 62 and 58, 64 can be brought into contact without having to force them together. The fasteners which hold the seal in place may then be tightened and as the segments are brought into alignment, the tapered surfaces move over one another resulting in tangential compression of the surrounding resilient material. Because the seals tend to slide into place as a result of the tapered contact, curling in the area of the interface is substantially reduced.

The seal of the present invention presents an advantage over the prior art when disassembled. Unlike the prior art, the mating tapered surfaces facilitate fast and easy disassembly of the segments.

In the preferred embodiment of the invention, each segment has been constructed identical to the other segments. It will be understood by those skilled in the art, that in other embodiments, different configurations could be used in which the segments are not identical. This may be done to insure that the seal segments are assembled in a particular order or in a particular way. Further, other embodiments of the invention may have configurations that are not circular, or may include various "tongue and groove" configurations at the ends.

Although in the preferred embodiment Applicants have used the same angle for the taper of adjacent mating surfaces, in other embodiments different surfaces may be tapered at differing angles. In fact, in some applications it may be desirable to have abutting surfaces extending at different angles to achieve particular types of interference fits when the seal segments are in position.

The preferred embodiment of the seal of the present invention is particularly useful because it can be installed between separable bodies of a space craft in outer space. When an astronaut is wearing a bulky spacesuit, it is difficult to perform assembly operations. The seal of the present invention is easier to fit together under such circumstances. More importantly, the present invention requires less force and effort for assembly. This is because unlike prior seals, the tightening of the fasteners used to hold the seal are sufficient to tangentially compress the resilient elements and produce an uninterrupted bead of resilient material through the interface of adjacent segments. Disassembly of the seal is also much easier.

Thus, the interlocking segmented seal of the present invention achieves the above stated objectives, eliminates difficulties encountered in the use of prior systems and devices, solves problems and attains the desirable results described herein.

In the foregoing description, certain terms have been used for brevity, clarity and understanding, however, no unnecessary limitations are to be implied therefrom because such terms are used for descriptive purposes and are intended to be broadly construed. Moreover, the descriptions and illustrations given are by way of examples and the invention is not limited to the exact details shown or described.

Having described the features, discoveries and principles of the invention, the manner in which it is utilized and the advantages and useful results obtained, the new and useful structures, devices, elements, arrangements, parts, combinations, systems, equipment, operations, methods and relationships are set forth in the appended claims.

We claim:

1. A continuous seal for isolating a first area bounded by said seal from an exterior area, said first area in communication with internal portions of first and second separable bodies, said seal being held by attachment means to at least one of said bodies; said seal including:
   a retainer, said retainer comprised of generally rigid material, said retainer having a first face and a second face generally opposed of said first face;
   said retainer comprised of separable segments, each of said segments having a first edge and a second edge, said first and second edges abutting second and first edges respectively of adjacent segments when said segments are assembled in said seal, at least one first segment being attached to a first body before at least one second segment is attached to said first body;
   each of said segments further including a resilient element mounted thereon, said element including a first portion extending normal or said first surface on each segment, and a second portion extending normal of said second surface on each segment;
   said first and second element portions each having first ends and second ends adjacent said first and second edges respectively of each segment, said first and second ends of said resilient element portions each extending beyond said first and second edges when said segments are in the unassembled condition, whereby said resilient element portions are in abutting compressed relation when said segments are assembled in said seal to provide continuity of said sealing elements about said seal;
   wherein an improvement comprises:
   said first and second ends of said resilient element portions comprising first and second tapered element surfaces respectively, said first and second surfaces extending at an acute angle relative to a direction normal of said first and second faces of said segments, and wherein said first tapered element surface of said first segment is directed outward and away from said first body, whereby upon attachment of said second segment to said first body said first and second tapered faces are in abutting compressed relation and dislocation of adjacent resilient element portions is minimized.

2. The seal according to claim 1 wherein said first edge of said retainer first segment includes a first tapered edge surface extending at a second acute angle relative to said normal direction, and said second edge of said retainer segment includes a second tapered edge surface extending generally parallel of said first tapered edge surface, and wherein said first tapered edge surface of said first segment is directed outward and away from said first body, whereby when said first and second segments are assembled adjacent segments are in contact along said first and second tapered edge surfaces.

3. The seal according to claim 2 wherein each of said segments includes tongue means adjacent said first edge, and groove means adjacent said second edge, said tongue means closely interfitting in said groove means of adjacent segments.

4. The seal according to claim 3 wherein said tongue means of said first segment includes a first wall surface bounding said tongue means, said first wall surface tapered at an acute angle of the normal direction, said first wall surface directed outward and away from said first body; and said groove means of a second segment includes a second wall surface bounding said groove means, said second wall surface extending generally parallel of said first wall surface, whereby said tongue and groove means of said adjacent first and second segments are in contact along said first and second wall surfaces when attached to said first body.

5. The seal according to claim 4 wherein said tongue means of said first segment includes a generally cylindrical protrusion and said groove means on said second segment includes a generally cylindrical recess, said first and second wall surfaces including arcuate portions, said arcuate portions centered about an axis, said arcuate portions of said first and second wall surfaces extending at said acute angle relative of said axis.

6. The seal according to claim 5 wherein said first tapered edge surface of said first segment is generally parallel of said second tapered edge surface at an opposed end of said first segment.

7. The seal according to claim 6 wherein said angle of said tapered edge and element surfaces of said first and second segments are from 2° to 7°.

* * * * *

UNITED STATES PATENT AND TRADEMARK OFFICE
CERTIFICATE OF CORRECTION

PATENT NO. : 5,149,109
DATED : September 22, 1992
INVENTOR(S) : Jerry G. Jelinek, et al It is certified that error appears in the above-indentified patent and that said Letters Patent is hereby corrected as shown below:

Column 6, line 32, "or" is changed to --of--.

Signed and Sealed this

Fourteenth Day of September, 1993

*Attest:*

BRUCE LEHMAN

*Attesting Officer*   *Commissioner of Patents and Trademarks*